(12) United States Patent
Chi

(10) Patent No.: US 10,350,635 B2
(45) Date of Patent: Jul. 16, 2019

(54) COATING METHOD OF REFLECTIVE FILM

(71) Applicant: GIANT KNITTING CO., LTD., Taichung (TW)

(72) Inventor: Ya-Ling Chi, Taichung (TW)

(73) Assignee: GIANT KNITTING CO., LTD., Taichung (TW)

(*) Notice: Subject to any disclaimer, the term of this patent is extended or adjusted under 35 U.S.C. 154(b) by 182 days.

(21) Appl. No.: 15/485,624

(22) Filed: Apr. 12, 2017

(65) Prior Publication Data

US 2018/0029073 A1 Feb. 1, 2018

(30) Foreign Application Priority Data

Aug. 1, 2016 (TW) .............................. 105124317 A

(51) Int. Cl.
*G02B 5/13* (2006.01)
*B05D 7/00* (2006.01)
*B05D 1/02* (2006.01)
*B05D 1/28* (2006.01)
*B05D 5/06* (2006.01)
*G02B 5/128* (2006.01)

(52) U.S. Cl.
CPC ............. *B05D 7/56* (2013.01); *B05D 1/02* (2013.01); *B05D 1/286* (2013.01); *B05D 5/06* (2013.01); *G02B 5/128* (2013.01); *G02B 5/13* (2013.01)

(58) Field of Classification Search
CPC .................................. G02B 5/128; B41M 1/34
See application file for complete search history.

(56) References Cited

U.S. PATENT DOCUMENTS

| 2004/0246321 | A1* | 12/2004 | Takashima | ........... | C09D 11/328 347/100 |
| 2011/0292508 | A1* | 12/2011 | Huang | .................. | B44C 1/1712 359/542 |
| 2012/0062908 | A1* | 3/2012 | Kuno | ................. | H04N 1/40025 358/1.8 |

* cited by examiner

*Primary Examiner* — Alex A Rolland
(74) *Attorney, Agent, or Firm* — Ming Chou; Sinorica, LLC

(57) ABSTRACT

A coating method of reflective film is first to prepare a glass beads film and then select a color to be coated. The color is composed of plural primary colors in fixed ratio, making the color have a standard ratio, which is obtainable from an original database. Next, ratios of the primary colors are respectively adjusted to form a printing ratio according to color fastness, permeability and light barrier property of each primary color attached to the glass beads and then, each primary color is orderly spray coated on the glass beads film to form a coating layer with micro-printing technique in accordance with the printing ratio, thus completing manufacturing of a reflective film with high transmittance and high wide angle.

4 Claims, 3 Drawing Sheets

COATING METHOD OF REFLECTIVE FILM

BACKGROUND OF THE INVENTION

1. Field of the Invention

This invention relates to a coating method, particularly to the coating method of reflective film.

2. Description of the Prior Art

A method of producing a conventional reflective film is first to prepare a glass beads film and then mix paint color to be coated on the glass beads film and subsequently, the paint is covered over the glass beads film via screen printing, thus completing manufacturing of a reflective film. However, since each kind of color is composed of plural primary colors respectively in fixed ratio, making the color have a standard ratio and further, color fastness and permeability of the primary colors attached to the surfaces of the glass beads are different; therefore, if the paint color is mixed according to the standard ratio, the finished product of the reflective film will be poor in reflectance and in wide angle.

In view of this situation, in order to avoid the color layer obstructing the glass beads on the glass beads film to affect reflectance and wide angle of the reflective film, the conventional manufacturing process further employs a way of scraping to remove the paint covered on the top side surface of the glass beads after the paint is coated for completing a finished product of reflective film of high reflectivity, but such a way will render integral production complicated. Therefore, having observed the above-mentioned drawbacks, the inventor of this invention thinks that the conventional way of producing the reflective film is necessary to be ameliorated and hence devises this invention.

SUMMARY OF THE INVENTION

This invention is devised to offer a coating method of reflective film, able to make the finishing product of reflective film have good reflectance and wide angle, and simple and convenient in manufacturing processes.

The coating method of reflective film in the present invention includes the following steps: A first step is to prepare a glass beads film, which contains a film and a plurality of glass beads covered on the surface of the film; a second step is to select a color to be printed and obtain the standard ratio of the color. Each kind of color contains plural primary colors whose ratios are respectively constant value, making the color have a standard ratio, which is obtainable from an original database; a third step is to adjust the ratio of each primary color of the standard ratio according to difference of color fastness and permeability of each primary color attached to the glass beads for forming a printing ratio, which can be gained from an adjustment value database; and a fourth step is to have the primary colors orderly spray coated on the glass beads film with micro-printing technique according to the printing ratio of the primary colors after the printing ratio is adjusted. Simultaneously, the primary colors will flow through the glass beads and then flow to the surface of the film to form a coating layer of the color on the surface of the film for shaping a reflective film.

The coating method of reflective film of this invention is to adjust the ratios of the primary colors via the adjustment value database according to color fatness and permeability of each primary color attached to the glass beads and then micro-printing technique is employed to have each primary color orderly spray coated on the glass beads film. Thus, this invention is unnecessary to carry out scraping of the surfaces of the glass beads after printing and hence, the reflective film of this invention has good transmittance and wide angle and further is simple and convenient in manufacturing processes.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
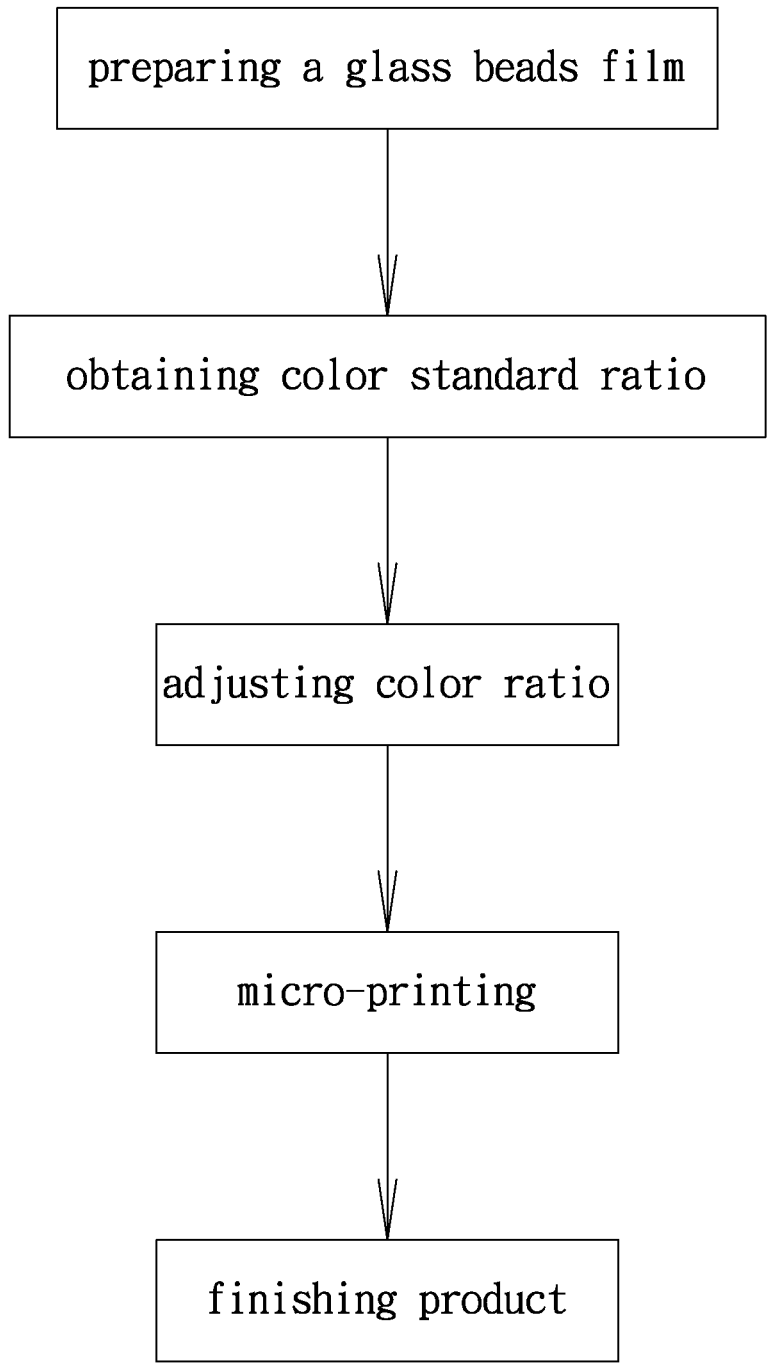
FIG. 1 is a manufacturing process block diagram of a coating method of reflective film in the present invention.
Figure 2:
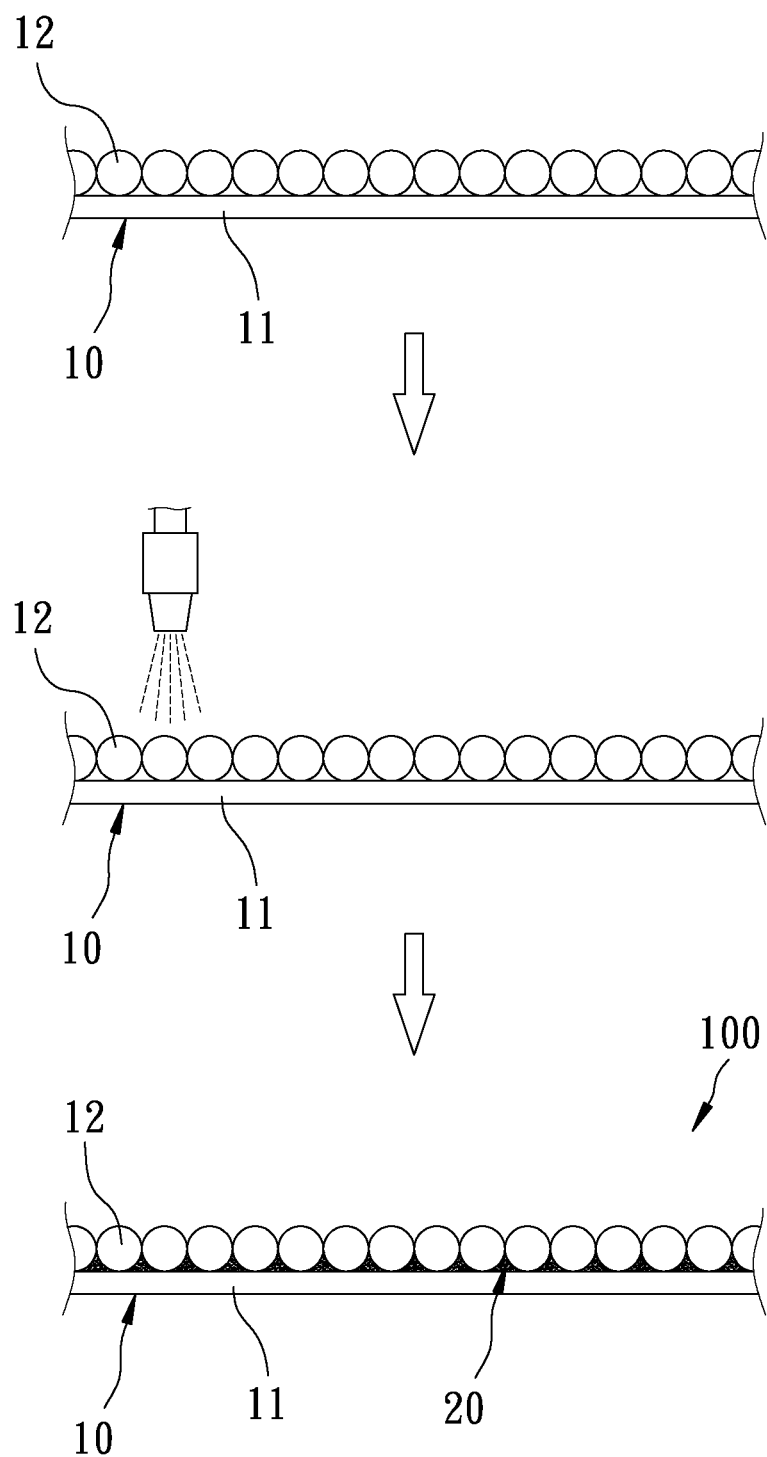
FIG. 2 is a manufacturing process schematic view of the coating method of reflective film in the present invention.

A preferred embodiment of a coating method of reflective film in the present invention, as shown in FIGS. 1 and 2, includes the following steps:

A first step is to prepare a glass beads film 10, which contains a film 11 and a plurality of glass beads 12 covered on the surface of the film 11.

A second step is to select a color to be printed and obtain the standard ratio of the color. Each color contains plural primary colors and the ratios of the primary colors are respectively constant value to make the color have a standard ratio, which is obtainable from an original database. In this preferred embodiment, the original database is a CMYK color code database and each color is composed of four primary colors: cyan, magenta, yellow and key (black).

A third step is to adjust the ratio of each primary color of the standard ratio for forming a printing ratio in accordance with difference of color fastness and permeability of each primary color attached to the glass beads 12. The printing ratio can be gained from an adjustment value database and in this preferred embodiment, the permeability of each primary color attached to the glass beads is shown in the following table:

|  | primary color | | | |
| --- | --- | --- | --- | --- |
|  | cyan | magenta | yellow | key |
| permeability | 10.5% | 22.8% | 68.2% | 0% |

The fourth step is to have the primary colors orderly spray coated on the glass beads film 10 with micro-printing technique in accordance with the printing ratio after adjusted. The primary colors will flow through the glass beads 12 and then flow to the surface of the film 11 to form a coating layer 20 with the color on the surface of the film 11 for shaping a reflective film 100.

For specifically understanding the structural features, the technique employed and the expected effect to be attained of this invention, the method of application of this invention is hereby stated as follows:

Referring to FIGS. 1 and 2, a user first prepares the film 11 and has the surface of the film 11 covered with a plurality of glass beads 12 and then selects a color to be printed and obtains the standard ratios of the four kinds of primary colors: cyan, magenta, yellow and key of the color from the original database. Subsequently, the user obtains the permeability of each primary color attached to the glass beads 12 from the adjustment value database and adjusts the ratio of the primary color to form the printing ratio according to the permeability of each primary color. For instance, the color in this preferred embodiment adopts CMYK color code, and the permeability of the primary color yellow is higher than that of other primary colors so the ratio of yellow will be increased. Lastly, a way of micro-printing is employed to have the primary colors orderly spray coated on the glass beads film 10 according to the printing ratio to complete manufacturing of the reflective film 100. By so designing, the reflective film 100 of this invention is unnecessary to mix the color in advance and also needless to carry out scraping of the surface of the glass beads after printing, able to attain good transmittance and wide angle, and simple and convenient in manufacturing processes. What is worth mentioning is that the primary colors are high transparent ink with comparatively high permeability.

Figure 3:
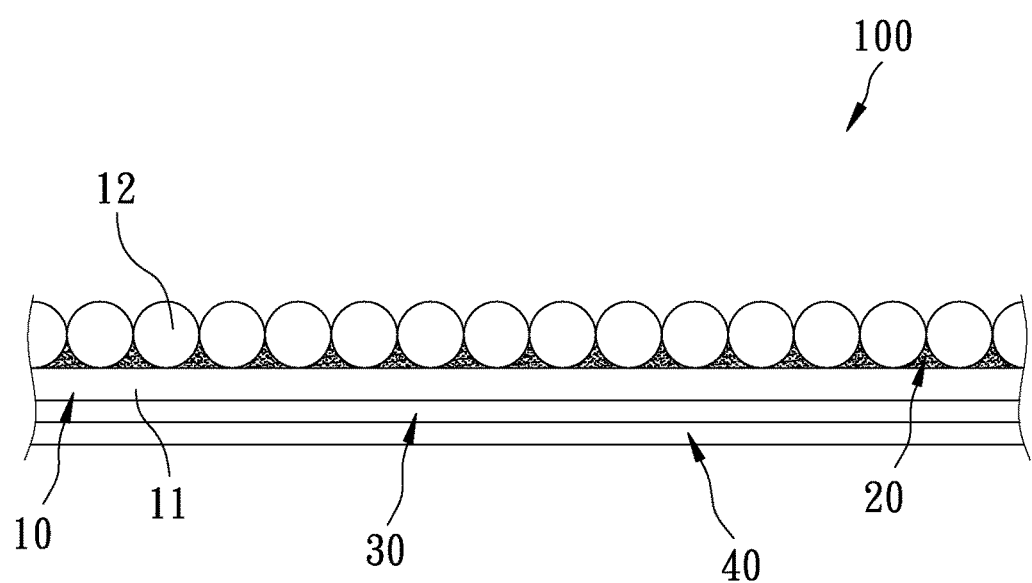
FIG. 3 is a side view of the reflective film in the present invention, showing that the reflective film is combined with a glue layer and a release paper.

Referring to FIG. 3, after the reflective film 100 is formed, a glue layer 30 is hot pressed on the film 11 at one side opposite to the glass beads 12, and a release paper 40 is combined with the surface of the glue layer 30 and thus, after the release paper 40 is torn off, the reflective film 100 can be attached to any article.

Thus, through the adjustment value database, the ratios of the primary colors can be adjusted in accordance with color fastness and permeability of each primary color attached to the glass beads 12 and then, the primary colors adjusted in ratio are orderly spray coated on the glass beads film 10 via the micro-printing technique, able to greatly enhance transmittance and wide angle. Therefore, the method of producing the reflective film in the present invention is unnecessary to mix the color beforehand and needless to carry out scraping of the surfaces of the glass beads after printing, having good transmittance and wide angle, and simple and convenient in manufacturing processes.

While the preferred embodiment of the invention has been described above, it will be recognized and understood that various modifications may be made therein and the appended claims are intended to cover all such modifications that may fall within the sprit and scope of the invention.

What is claimed is:

1. A method of generating a reflective film device comprising:
    providing a glass beads film, the glass beads film comprising a film body and a plurality of glass beads, the film body comprising a first surface, the first surface being covered with the plurality of glass beads;
    selecting a color to be printed, the color comprising a standard ratio and a plurality of primary colors, a ratio of each of the plurality of primary colors being constant value, the standard ratio being obtainable from an original database;
    adjusting the standard ratio of the color by adjusting the ratio of each of the plurality of primary colors according to a color fastness and a permeability of each of the plurality of primary colors attached to the plurality of glass beads for forming a printing ratio, the printing ratio being obtainable from an adjustment value database; and
    orderly spray-coating the plurality of primary colors on the glass beads film by performing a micro-printing technique according to the printing ratio after adjusting the ratio of each of the plurality of primary colors, such that the plurality of primary colors flow through the plurality of glass beads and then flow to the first surface of the film body so as to form a coating layer with the color on the first surface of the film body for generating the reflective film device; and
    enhancing a reflectance and increasing a wide angle of the reflective film device by adjusting the ratio of each of the plurality of primary colors based on the adjustment value database and by performing the micro-printing technique.

2. The method as claimed in claim 1, wherein a second surface of the film body is hot pressed with a glue layer, the first surface and the second surface are oppositely located to each other, a release paper is attached to the glue layer, and the glue layer is located in between the film body and the release paper.

3. The method as claimed in claim 1, wherein each of the plurality of primary colors is a transparent ink.

4. The method as claimed in claim 1, wherein the original database is a CMYK color code database, and the plurality of primary colors comprise cyan, magenta, yellow and key (black).

* * * * *